Sept. 26, 1961     S. HAMMER     3,001,209
SINK CLAMPS
Filed Feb. 2, 1959
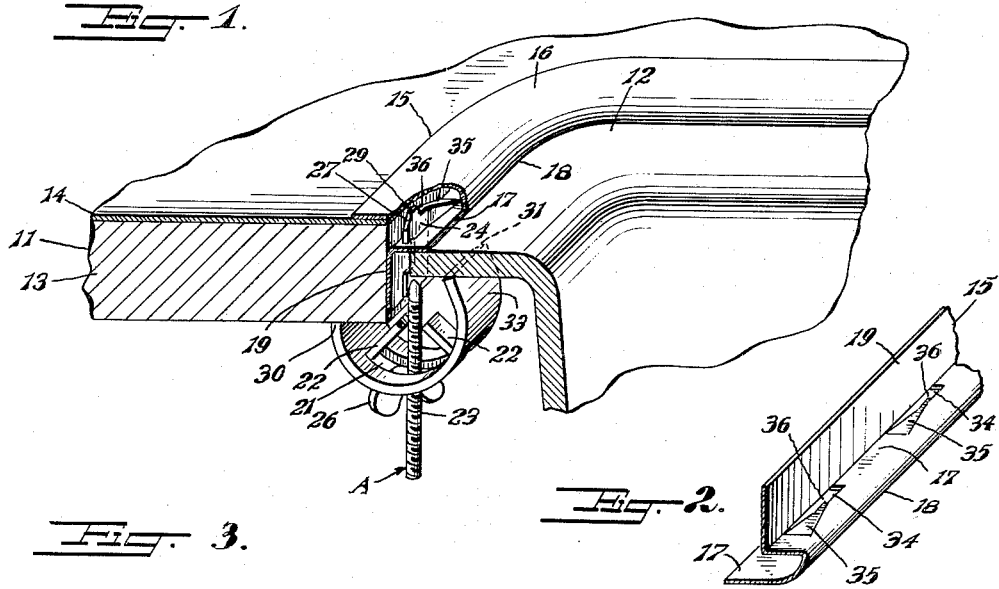
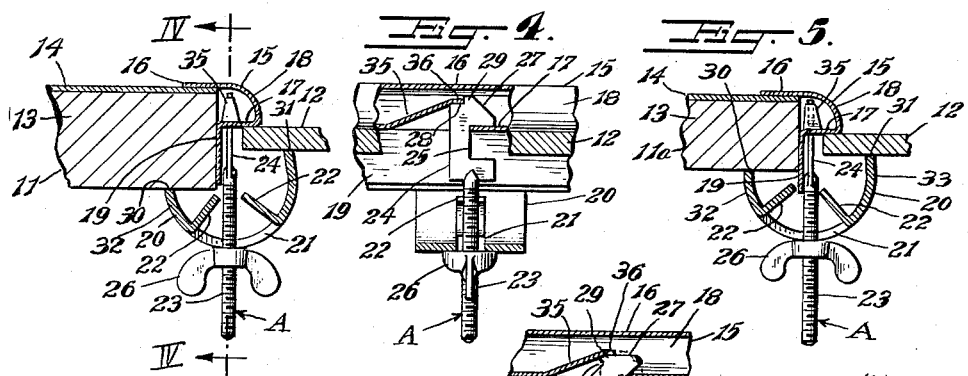
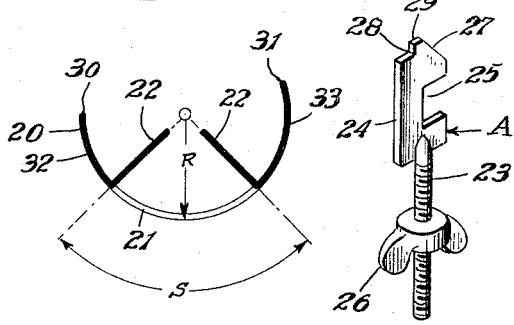
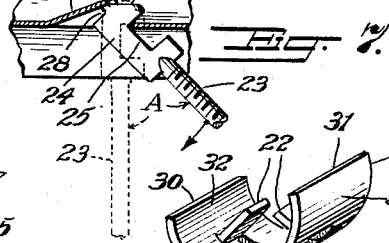
INVENTOR.
SAMUEL HAMMER.
BY
Howard P. King
ATTORNEY.

United States Patent Office 3,001,209
Patented Sept. 26, 1961

3,001,209
SINK CLAMPS
Samuel Hammer, 8 E. 36th St., New York, N.Y.
Filed Feb. 2, 1959, Ser. No. 790,484
3 Claims. (Cl. 4—187)

This invention relates to clamps, and more particularly to an improved clamp for assembly of a sink with a drainboard or countertop or similar supporting structure.

When mounting a sink having a flat flange, it is customary, according to one mode of present-day construction, to provide an opening in the countertop or drainboard which is slightly larger than the outside dimensions of the sink, the sink being supported within the opening so that the flange is disposed opposite to, but spaced from, the marginal edge of the opening. The space between the sink flange and edge of the countertop is closed by a suitable molding or trim, known in the trade as a "ring," having portions which overlap and are drawn down tightly against the marginal edges of the sink flange and countertop opening to form a seal therebetween.

It is an object of the present invention to provide a clamp of improved construction adapted for use with fixtures of different thicknesses in any one installation, such as with a steel sink and a wood-backed sink board, drainboard or countertop.

Of similar nature, an object of the invention is to provide an improved construction of clamp for use with fixtures the thicknesses of which may vary in different installations.

Another object of the invention is to provide a clamp, which when tightened, applies all forces in directions perpendicular to the sink flange, countertop or the like where used.

More specifically, an object of the invention is to provide a clamp comprising a cleat, stud and nut of simple and effective character.

The invention further contemplates provision of a cleat against which the nut will have a tangential bearing in any of various positions of the cleat resulting from engagement with any selected fixture irrespective of the thickness thereof within the usual range of dimensions of the class of fixtures with which the clamp is used.

An essential object of the invention is to provide a clamp which can be conveniently installed in assembled relationship with the fixture with which it is used and which will automatically compensate for material differences in the thickness of the members which it clamps together.

Another essential object of the invention is to provide an improved construction wherein the stud interlocks with the trim from which it is supported.

Other objects, advantages and novel structural features will appear to persons skilled in the art to which the invention appertains as the description proceeds, both by direct recitation thereof and by inference from the context.

Referring to the accompanying drawing, in which like numerals of reference indicate similar parts throughout the several views:

FIGURE 1 is a perspective view of proximate margins of a sink flange and wood-backed countertop and associated trim showing my improved clamp in place therewith, a part of the trim being broken away to more clearly illustrate the manner in which engagement of the clamp with the trim is effected.

FIGURE 2 is a perspective view of a portion of the trim, which is in a position inverted to the showing thereof in FIG. 1;

FIGURE 3 is a sectional view of the countertop, sink flange, clamp and associated trim assembly on a plane medially of the clamp and perpendicular to the clamp axis;

FIGURE 4 is a sectional view on line IV—IV of FIG. 3;

FIG. 5 is a view corresponding to FIG. 3, but illustrating the manner in which the clamp automatically adjusts to accommodate a countertop of materially different thickness from that of FIG. 3;

FIGURE 6 is a perspective view of the stud and nut;

FIGURE 7 is a fragmentary view of a portion of the trim with which a stud is in a first stage of being assembled therewith;

FIGURE 8 is a perspective view of the cleat; and

FIGURE 9 is an end view of the cleat illustrating the angle of adjustment afforded therefor on the stud.

With specific reference to the drawing, in FIGURE 1 there is illustrated a sink 10 installed within an opening in a countertop or drainboard 11. The sink 10 may be any conventional type terminating around the upper edge thereof in a continuous outwardly extending horizontal rim or flange 12. The countertop 11 may comprise any suitable support structure, as for example a wood base 13 which may appropriately be covered with a water resistant composition surfacing material 14, such as one of the presently popular plastics available in sheet form.

In accordance with the construction previously mentioned as prevailing in the art, the opening in the countertop 11 is somewhat larger than the dimensions of the sink flange 12. Thus the sink 10 may be inserted freely into the opening with adequate clearance between the marginal edges of the sink flange 12 and countertop 11 to accommodate a metal trim or "ring" 15 adapted to support the sink within the opening and effect a seal with the marginal edges of the sink flange and countertop in the manner hereinafter described.

The metal trim 15 has a cross-sectional shape which may be described briefly as sickle-shaped or as a rearwardly open loop with an upper reach 16 and a lower reach 17 connected by a riser portion 18 and having a leg 19 depending downwardly from the lower reach, so as to have the form of an incomplete letter P. The upper reach 16 is considerably longer than the lower reach 17 and both reaches are so dimensioned that when the leg 19 is inserted into the space between the sink flange 12 and the edge of the countertop 11 against the latter, said reaches will respectively overlap the proximate margins of said countertop and sink flange. The trim 15 is manufactured as a complete frame from stiff but resilient sheet metal so that it may be installed as a unit into assembled relationship with the countertop 11 and sink 10 in spanning relationship with the marginal edges thereof as above described.

The clamp in accordance with the present invention comprises a preferably arcuate body member or cleat 20 of generally U-shaped cross-sectional configuration having a curvature about an axis and having a slot 21 of uniform width therein which extends for a considerable distance in the direction of curvature of said cleat. A pair of fingers 22 project toward the said axis inwardly into the cleat 20 from the ends of the slot 21. The inwardly directed ends of said fingers are in spaced apart relationship proximate to said axis to permit a stud, generally indicated by the reference character A, to be inserted therebetween and into said slot 21.

As illustrated in FIGURE 6, said stud A comprises shank 23 with an integrally formed head 24 which is blade-like in character and extends longitudinally of and beyond the shank. In use, the blade-like head is in a plane transverse to the slot 21 of the cleat. Said head is shown as C-shaped so as to have a notch 25 which, for orienting descriptive purposes, will be arbitrarily referred to as open forwardly of the head or blade. The shank 23 is threaded and carries a threaded adjustable member such as a wing-nut 26. The upper extremity of the C-shaped head 24 has an upwardly and rearwardly sloped leading edge 27 which is followed by and communicates with a downwardly extending step-like declivity 28 in the upper rearward or trailing corner of said blade portion of the head 24 thereby providing from said sloping leading edge to the declivity, an upwardly protruding tooth 29. The diameter of the shank 23 is smaller than the width of the slot 21 and smaller than the space between the inner ends of fingers 22 so that said cleat may be introduced onto the shank of the stud and assume desired angular relationship thereto within the range of tilt permitted by said slot, said finger-ends functioning as a fulcrum for the stud proximate to the axis of curvature of the cleat. Application of the nut 26, which is considerably larger than the width of the slot 21, to the part of shank 23 protruding beyond the convex face of cleat 20 and having tangential footing thereagainst, keeps the stud A coupled to said cleat in the above-described relation to form the clamping unit of this invention.

As shown in FIGURE 8, the cleat 20 is preferably a segment of an open-ended hollow cylinder which thereby provides longitudinal straight terminal edges 30, 31 in a common chordal plane. Said fingers 22 are coined from the cylindrical wall using metal displaced in forming slot 21, and are radially disposed within the cleat toward but not reaching the axis thereof. The slot 21 is preferably non-symmetrically located with respect to said straight terminal edges of the cleat 20 so that the intervening region 32 from one slot end to its proximate straight terminal edge 30 is shorter than a longer region 33 intervening between the other end of the slot and its proximate straight terminal edge 31. While the configuration of the end regions 32, 33 need not be arcuate as here shown, it is essential that the slotted portion of the cleat 20 constitute a segment of a cylinder against which the nut may seat tangentially. Said slotted cylindrical region is indicated as having a radius R from its axis and with said fingers radially disposed from said cylindrical region at the slot ends toward said axis and engaging the stud proximate to said axis so as to effectively pivot the cleat on the stud at said axis by virtue of the confinement of the stud between the finger ends at the axis. The rotation is confined to an angle S established by the included angle between the two fingers. The structure thus enables the cleat to pivot even though the nut is snug against the cylindrical surface. Consequently the straight terminal edges 30, 31 of the cleat may be caused to seat against the under faces of the countertop and sink flange by rotary movement of the cleat on the stud while the stud remains in its desired perpendicular relation to said countertop and sink flange.

In making an installation, the sink 10 is lowered into the drainboard opening with the trim frame in place on the sink flange 12, and when the upper reach 16 rests in its supporting position on the drainboard or countertop, the sink obtains its support therefrom by application of the cleat 20 to the stud A and application of the nut 26 to the stud shank 23. While the stud may be applied to the trim after the trim and sink are lowered into place, it will usually be found more convenient to mount the stud on the trim in advance of applying the trim to the sink.

The first phase of assembling the clamp with the trim 15 is illustrated in FIG. 7, and consists in initially sloping the stud between horizontal and vertical and while in that position forcibly inserting the toothed end of the C-shaped head 24 of the stud into an aperture 34 provided in the lower reach 17. According to this embodiment of my invention, said aperture 34 is formed by coining an elongated detent element 35 from the lower reach 17 so that the detent utilizes metal resultant from making said aperture. Said detent is in the form of a resilient tongue integral at one end thereof with the said reach and extending longitudinally of said aperture. Said aperture and tongue are adjacent to the junction of said lower reach 17 and leg 19 and extend in a direction longitudinally of the trim. Said resilient tongue or detent 35 is sprung upwardly as the stud head 34 is pushed thereagainst. As shown in FIG. 2, a plurality of such apertures and detent tongues are provided at preselected locations along the trim frame. The bite end 36 of the tongue 35 is properly formed, dimensioned and located to snap into declivity 28 of the stud when the stud is straightened up as shown in FIG. 4. In the said first stage of assembly, with the upper end portion of the blade inserted into said aperture 34 and with the upper corner of the C-notch seated against the end of said aperture and the stud sloping as above described, leading edge 27 is in camming engagement with the tongue or detent. Progressing from this tilted and partially located stud position and utilizing engagement of the C-notch at the end of the aperture as a fulcrum, the stud is swung to an upright position, thereby forcing the bite end 36 of the tongue 35 to ride over the leading edge 27 of the blade and over the tooth 29 to snap into the declivity 28, where it makes ratchet-like engagement and thereby retains the stud locked in an upright position.

Now with the stud locked in place and the trim on the sink flange and the sink lowered into the opening in the countertop, the cleat is applied to the stud shank and followed with the wing nut which engages tangentially against the curved portion of the cleat. Further advancement of the nut 26 applies an upward thrust to said cleat and thereby causes the upper straight terminal edges 30, 31 of the cleat to press against the under surfaces of the countertop 11 and sink flange 12 and at the same time to apply downward pull on the stud and its supporting reach 17 of the trim thereby seating the trim tightly and supporting the sink in its appointed place. It should be particularly noted that the clamping force applied by the stud to the trim and by the cleat to the countertop and sink will always be in a direction perpendicular to the trim, countertop and sink flange regardless of the thicknesses thereof since the clamp permits relative rotation of the cleat 20 as far as may be required through angle S about the curved-surface axis, that axis coinciding with theoretic intersection of the fingers 22. Thus, as nut 26 is tightened, the cleat 20 (if not already oriented to simultaneously contact the undersurfaces of the countertop 11 and sink flange 12) will be advanced upwardly until one longitudinal straight terminal edge of the cleat strikes either the countertop or sink flange, whichever is closer, and then rotatively shift relative to the stud until the other longitudinal straight terminal edge of the cleat contacts and seats against the other of said undersurfaces. Consequently, the clamp not only automatically adjusts itself to effect the desired engagement of the members being clamped, but affords a range of adjustability such that it can be used with a countertop 11a of materially less thickness as illustrated in FIG. 5, than thickness shown in FIG. 3, and with supporting and sink fixtures of different construction as regards thickness dimensions than are here illustrated.

I claim:

1. A combination of a countertop having an opening and a sink having a flange disposed opposite to but spaced from the margin of said opening, a trim frame for said opening, said trim frame having a cross-sectional sickle shape providing upper and lower reaches respectively overlying the proximate edges of said countertop and sink flange respectively, said lower reach having a longitudinal aperture, a detent longitudinally of said aperture, and a clamp comprising a cleat and a stud, said cleat engaging said countertop and sink flange in opposition to said reaches, and said stud protruding into said aperture and in part overlying and engaging said lower reach adjacent to an end of said aperture, and another part of said stud having a declivity engaged by said detent for thereby retaining the blade end of said stud assembled with said trim frame.

2. A combination of a countertop having an opening and a sink having a flange disposed in said opening opposite to but spaced from the margin of said opening, a trim frame for said opening, said trim frame having an elongated aperture therein, and said trim frame providing a first surface adjacent to said aperture, and said countertop and sink flange providing two other surfaces, a cleat of generally U-shape thereby providing a curved portion extending in a direction of the curvature of said cleat, a pair of fingers both of which are coined from said cleat and slope from the respective ends of said slot inwardly of said curved portion adjacent to the center of curvature evenly spaced therefrom, a stud extending through said slot and radially therefrom to and between said fulcrums and therebeyond, said stud having a blade-like hooked element at the end of the stud extending between said fulcrums engaging in said aperture and onto said first surface at an end of said aperture, an adjustable member on the other end portion of said stud engaging said curved portion of the cleat forcing edges of said cleat into engagement with said other two surfaces, said stud being tiltable in said slot and said member being movable on said curved portion of the cleat, and a resilient detent extending in a direction longitudinally of said aperture toward the said end engaged by said hooked element, said detent having less length than said aperture and engaging at its end against said hooked element bracing said blade-like element from backward tilting.

3. A clamp of the character described, comprising a cleat of generally U-shape thereby providing a curved portion, a slot of uniform width in the said curved portion extending in the direction of curvature thereof, a pair of fingers both of which are coined from said cleat and slope from the respective ends of said slot inwardly of said curved portion adjacent to the center of curvature thereof and providing fulcrums at their ends at opposite sides of said center of curvature evenly spaced therefrom, a stud having a head and having a screw-threaded shank extending through said slot radially therefrom to and between said fulcrums and therebeyond, and said head comprising a blade-like element having a gripping notch at one edge for gripping a first surface, and an adjustable screw-threaded member on said screw-threaded shank, said member engaging said curved portion of the cleat for forcing edges of said cleat into engagement with two other surfaces, said stud being tiltable in said slot and said member being movable on said curved portion of the cleat, said blade-like element having its upper end upwardly and rearwardly sloped providing a leading edge and having its rearward upper corner stepped downwardly providing a declivity for engagement by a part of said first surface applying pressure tending to seat the said notch of the blade-like element in a direction lateral to said head and shank.

References Cited in the file of this patent

UNITED STATES PATENTS

| | | |
|---|---|---|
| 1,044,893 | Lathrop | Nov. 19, 1912 |
| 1,904,296 | Royse | Apr. 18, 1933 |
| 2,157,786 | Coordes | May 9, 1939 |
| 2,411,629 | Lane | Nov. 26, 1946 |
| 2,582,816 | Bonnell | Jan. 15, 1952 |
| 2,770,161 | Schutte | Nov. 13, 1956 |
| 2,810,539 | Levy et al. | Oct. 22, 1957 |
| 2,843,855 | Hammer | July 22, 1958 |